United States Patent [19]

Khuong

[11] Patent Number: 4,557,452
[45] Date of Patent: Dec. 10, 1985

[54] SPACE-SAVING HANGING DEVICE

[76] Inventor: Nhon H. Khuong, 1707 W. 149th St., Gardena, Calif. 90247

[21] Appl. No.: 522,788

[22] Filed: Aug. 12, 1983

[51] Int. Cl.⁴ ............................................. E04G 5/06
[52] U.S. Cl. .................................. 248/214; 248/311.2
[58] Field of Search ............... 248/214, 311.2, 289.1, 248/274; 211/85; 403/353

[56] References Cited

U.S. PATENT DOCUMENTS

| 2,649,270 | 8/1953 | Franks | 248/311.2 |
| 2,754,078 | 7/1956 | Koger et al. | 248/311.2 |
| 2,991,907 | 7/1961 | Kinnison | 248/311.2 |
| 3,127,114 | 3/1964 | Shaw | 248/214 |
| 3,233,858 | 2/1966 | Benjamin | 248/311.2 |
| 3,989,213 | 11/1976 | Allen | 248/214 |
| 4,434,961 | 3/1984 | Hoye | 248/311.2 |

Primary Examiner—Ramon S. Britts
Assistant Examiner—Ramon O. Ramirez

[57] ABSTRACT

This hanging device consists of a mounting plate, a top member of hollow and circular shape, which is placed downwards against the mounting plate, when the device is not in use, and it encompasses a cup-like circular bottom member, which is pivoted upwards against the mounting plate, when the device is not in use, thus, enabling the device to be flat when not in use.

3 Claims, 9 Drawing Figures

U.S. Patent    Dec. 10, 1985    Sheet 1 of 2    4,557,452
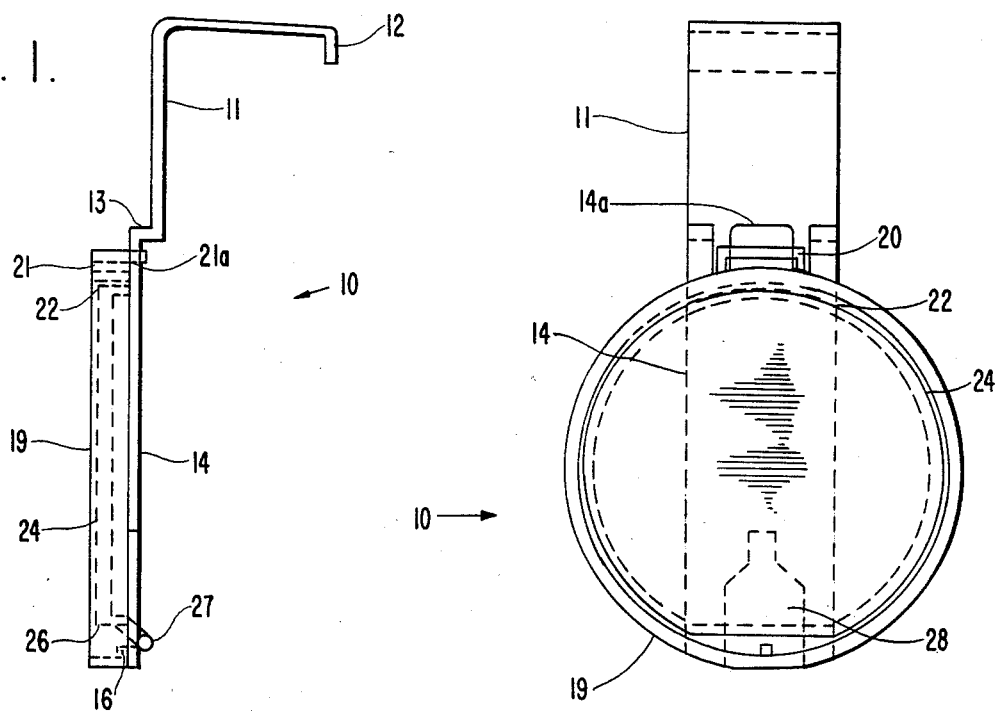
Fig. 1.
Fig. 2.
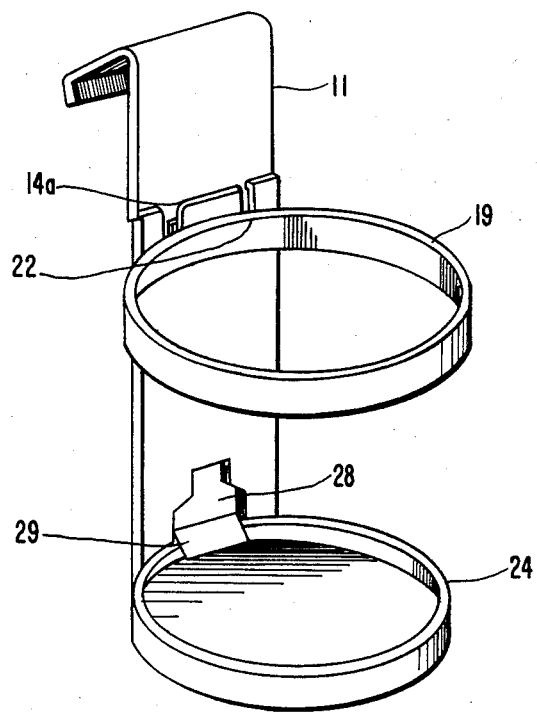
Fig. 9.

SPACE-SAVING HANGING DEVICE

BACKGROUND OF THE INVENTION

1. Field of the Invention

This invention relates to beverage holders which can be folded when not in use.

2. Description of the Prior Art

U.S. Pat. No. 2,649,270 discloses a folding receptacle holder for a beverage glass or the like. Two plates are held in a parallel relationship by appropriate linkage, and they both pivot on a back plate from an up or folded position to a down or open position. The outermost element defines a bottom plate when the apparatus is in its open position, and the uppermost element comprises a ring through which the cup, or the like, extends.

U.S. Pat. No. 2,754,078 discloses another type of holder in which a bottom plate folds outwardly from a back plate, and an upper ring folds outwardly and upwardly. For nesting or closed purposes, the upper ring folds downwardly and the bottom plate folds upwardly to enclose the ring and to act as a cover for the apparatus.

U.S. Pat. No. 4,434,961 discloses another type of holder apparatus which pivots and swivels to compensate for movement of a boat or vehicle to which the apparatus is secured and the entire assembly folds for storage when not in use.

SUMMARY OF THE INVENTION

The invention described and claimed herein comprises a foldable support holder for beverage containers, such as a cup, a glass, a can, a bottle, etc., which includes elements in two planes for maintaining the beverage container in a relatively vertical orientation. The container also can be folded when not in use.

Among the objects of the present invention are the following:

To provide new and useful beverage holder apparatus;

To provide new and useful beverage holder apparatus which is foldable for storage purposes;

To provide new and useful beverage holder apparatus for vehicles.

BRIEF DESCRIPTION OF THE DRAWING

FIG. 1 is a side elevational view of the present invention,

FIG. 2 is a front view of FIG. 1,

FIG. 9 is a perspective view of the invention.

DESCRIPTION OF THE PREFERRED EMBODIMENT

Figure 3:
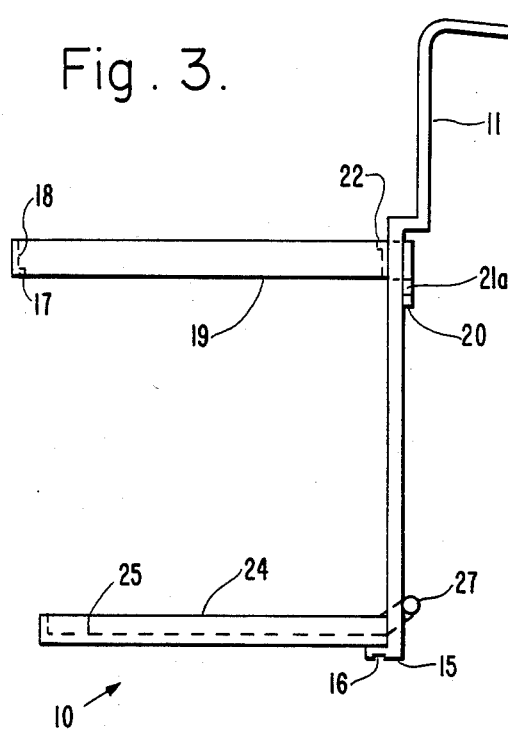
FIG. 3 is similar to FIG. 1, but shows the device in its open position.
Figure 4:
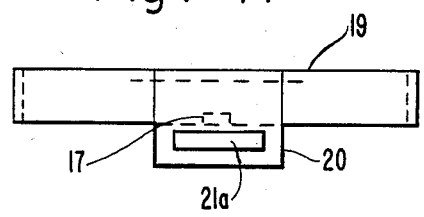
FIG. 4 is a rear view of the upper hanger member, shown removed therefrom.
Figure 6:
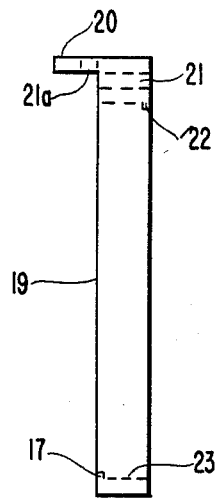
FIG. 6 is a side elevational view of FIG. 5.
Figure 5:
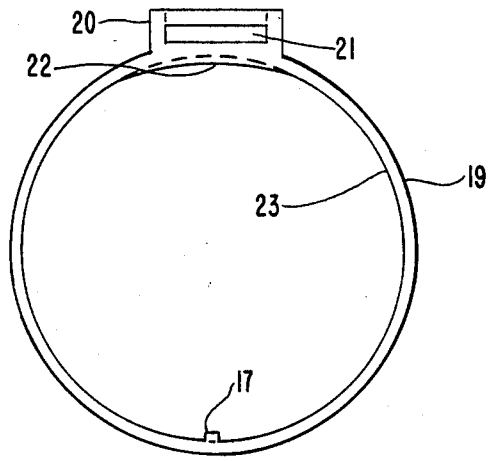
FIG. 5 is a bottom plan view of FIG. 4.

The cup holder apparatus 10 includes three elements: an inverted L-shaped bracket or mounting plate 11, an upper ring 19 and a cup like bottom element 24.

The bracket element 11 has a lip 12 for engaging the upper edge of a door or other structure. The bracket element 11 is provided with a lip member 14a which is a secured means for the upper ring 19. An opening 28 is provided at the bottom end of bracket 11 through which is inserted an extended arm 29 of the cup like element 24. The bracket 11 includes at its bottom end a small lip 15 with a small groove 16 which secure the upper ring 19 when is in its folded position.

The upper ring 19 comprises a slot 21 to secure it to lip 14a when the upper ring is in its horizontal supporting position to hold a cup of beverage or the like; and a second slot 21a disposed at a 90° angle relative to the first slot to secure the ring top element to lip 14a when is in its vertical folded position for storage. The upper ring 19 also includes a small lip 22 to secure the bottom cup like element 24 when the upper ring 19 is in its folded position, and a small spur 17 to lock and secure the upper ring 19 and bottom element 24 to bracket element 11 by stepping said spur into the bracket's groove 16.

Figure 7:
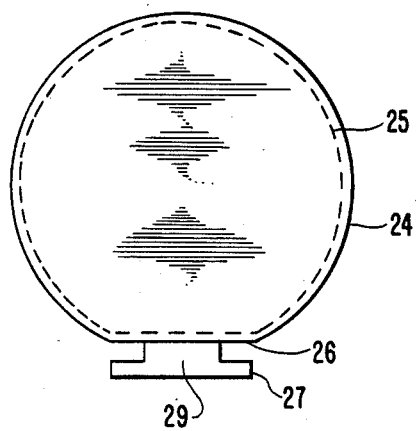
FIG. 7 is a bottom plan view of the lower member, shown removed from the device.
Figure 8:
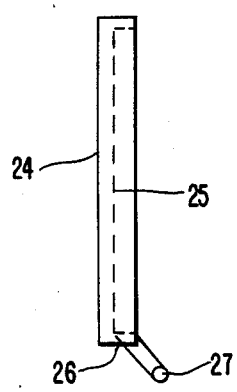
FIG. 8 is a right end elevational view of FIG. 7.

The arm 29 of the bottom member 24 includes two outwardly extending pins 27 as best illustrated at FIG. 7. These two pins work as a locking means to keep the bottom element 24 in its horizontal position to support a cup of beverage or the like by securely engaging the arm 29 when extended through the opening 28 to the back of bracket element 11.

When the use of apparatus 10 is no longer desired, the apparatus may be folded for storage as follows:

1. lift the cup like bottom member 24 upward at its remote side from the extended arm 29 to have its upper side against the front side of bracket element 11;
2. lift the upper ring element 19 out of the securing lip 14a and turn it 90° downward, and put it back with slot 21a engaging lip 14a;
3. push spur 17 into groove 16 to secure the upper ring element 19 to the bracket element 11; the upper ring element 19 by its lip 22 secures the bottom member in its vertical position for storage.

What I now claim is:

1. A foldable beverage holder device comprising a mounting plate element, a hollow ring top element pivotably secured to said mounting plate for retaining an article such as a cup of beverage or the like, a cup like bottom element pivotably secured to the bottom end of the mounting plate for supporting said article; said ring top element including two slots at one side disposed at a 90° angle relative to one another, one of said slots for engaging an upper lip located on the mounting plate when desired to secure the ring top element in a downward folded vertical position, and the other of said slots for engaging said upper lip when desired to secure the ring top element in a horizontal supporting position; said cup like bottom element including an extended arm which is inserted through an opening in the bottom end of the mounting plate, said extended arm comprising two pins extended outwardly from said extended arm at its end opposite from the cup like member to secure the cup like bottom member in a horizontal supporting position.

2. The apparatus of claim 1 in which the upper ring element includes a spur to engage into a groove located beneath the mounting plate for locking the upper ring top element in a vertical position to the mounting plate, and a lip member for securing the cup like bottom member in a vertical position.

3. The apparatus of claim 1 in which the mounting plate includes a lip for engaging the upper edge of a door or the like.

* * * * *